United States Patent
Riedl et al.

(10) Patent No.: US 10,371,200 B2
(45) Date of Patent: Aug. 6, 2019

(54) COMBINATION ELASTOMERIC AND CYLINDRICAL PLAIN BEARING

(71) Applicant: Aktiebolaget SKF, Gothenburg (SE)

(72) Inventors: Daniel L Riedl, Marengo, IL (US); Lester John Temple James, Sturminster Newton (GB); Michael Brett Colton, Bristol (GB); William Andrew Curry, Weston-Super-Mare (GB)

(73) Assignee: Aktiebolaget SKF, Göteborg (SE)

(*) Notice: Subject to any disclaimer, the term of this patent is extended or adjusted under 35 U.S.C. 154(b) by 0 days.

(21) Appl. No.: 15/833,264

(22) Filed: Dec. 6, 2017

(65) Prior Publication Data
US 2019/0170188 A1    Jun. 6, 2019

(51) Int. Cl.
*F16C 23/04* (2006.01)

(52) U.S. Cl.
CPC ........ *F16C 23/045* (2013.01); *F16C 2208/10* (2013.01)

(58) Field of Classification Search
CPC .................. F16C 11/0614; F16C 11/0638; F16C 23/043; F16C 23/045
See application file for complete search history.

(56) References Cited

U.S. PATENT DOCUMENTS

| | | | | |
|---|---|---|---|---|
| 4,268,094 A * | 5/1981 | Greene | ................. | F16C 17/03 384/107 |
| 5,364,191 A * | 11/1994 | Gruber | ................. | B62D 7/16 384/153 |
| 7,658,546 B2 * | 2/2010 | Clarke | ................. | F16C 11/0614 384/192 |
| 9,010,679 B2 | 4/2015 | Sutton | | |
| 2015/0093057 A1 * | 4/2015 | Hunter | ................. | B64C 27/35 384/125 |
| 2016/0238068 A1 * | 8/2016 | Bohm | ................. | B64C 13/30 |
| 2016/0238069 A1 * | 8/2016 | Bohm | ................. | B64C 13/30 |

FOREIGN PATENT DOCUMENTS

WO    WO-2005075850 A1 *  8/2005  ............ B64C 27/56

* cited by examiner

*Primary Examiner* — Phillip A Johnson
(74) *Attorney, Agent, or Firm* — Mark Ussai; SKF USA Inc. Patent Dept.

(57) ABSTRACT

A bearing assembly is for movably coupling first and second members, one being movable relative to the other. A plain bearing section includes an inner ring having a bore for receiving the first member and an outer cylindrical bearing surface. An outer ring is disposed about the inner ring and has an inner cylindrical bearing surface disposed against the inner ring bearing surface, one bearing surface sliding against the other when the movable member displaces about a first axis. The two rings engage to prevent relative displacement between the rings when the movable member displaces about a second axis. An elastomeric bearing section is disposed about the plain bearing section, is connected with the second member and is formed such that at least a portion of the elastomeric bearing section flexes when the movable member angularly displaces about the second axis.

17 Claims, 15 Drawing Sheets

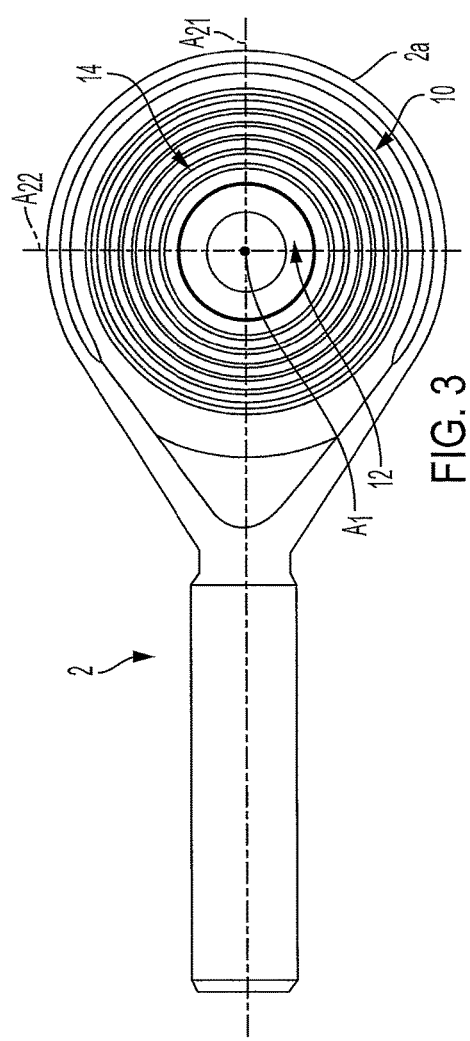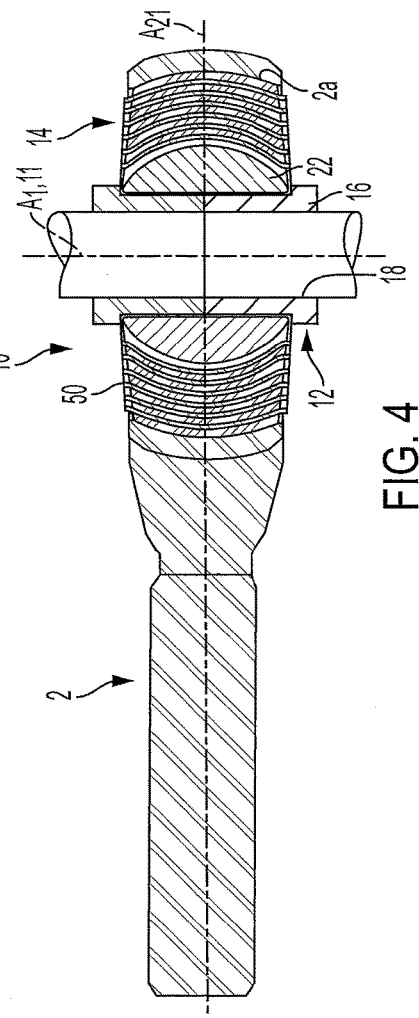

COMBINATION ELASTOMERIC AND CYLINDRICAL PLAIN BEARING

BACKGROUND OF THE INVENTION

The present invention relates to bearing assemblies, and particularly to elastomeric bearing assemblies used in aircraft applications.

Elastomeric bearings are known and are often formed of a plurality of alternating annular or cylindrical layers of elastomer and metal and generally include a central bore for receiving a shaft or pin. Such bearings are capable of supporting pivoting or limited partial rotation or twisting motions of the pin or shaft, or a link or other member coupled by the pin/shaft to a housing, bracket, etc. However, when such pivoting or twisting of the shaft, link, etc. is greater than a certain angular magnitude, the elastomeric layers can become damaged, particularly after prolonged use.

SUMMARY OF THE INVENTION

In one aspect, the present invention is a bearing assembly for movably coupling a first, inner member with a second, outer member, a movable one of the first and second members being angularly displaceable with respect to the other one of the two members about a first axis extending centrally through the inner member and about at least one second axis generally perpendicular to the first axis. The bearing assembly comprises an inner plain bearing section including an inner ring, the inner ring being connectable with the first member and having an outer circular cylindrical bearing surface, and an outer ring disposed about the inner ring and having an inner circular cylindrical bearing surface disposed against the inner ring bearing surface. The inner ring bearing surface or the outer ring bearing surface is slidable against the other bearing surface when the movable one of the first and second members angularly displaces about the first axis. The inner and outer rings are engageable with each other to substantially prevent relative displacement between the two rings when the movable one of the first and second members angularly displaces about the at least one second axis. Further, an outer elastomeric bearing section is disposed about the plain bearing section, connected with the second member and configured such that at least a portion of the elastomeric bearing section flexes when the movable one of the first and second members angularly displaces about the second axis.

In another aspect, the present invention is a mechanical assembly comprising the first, inner member, the second, outer member and the bearing assembly as recited in the paragraph above.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3 is a top plan view of the bearing assembly and second member;

FIG. 4 is a view through line 4-4 of FIG. 3;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 17:
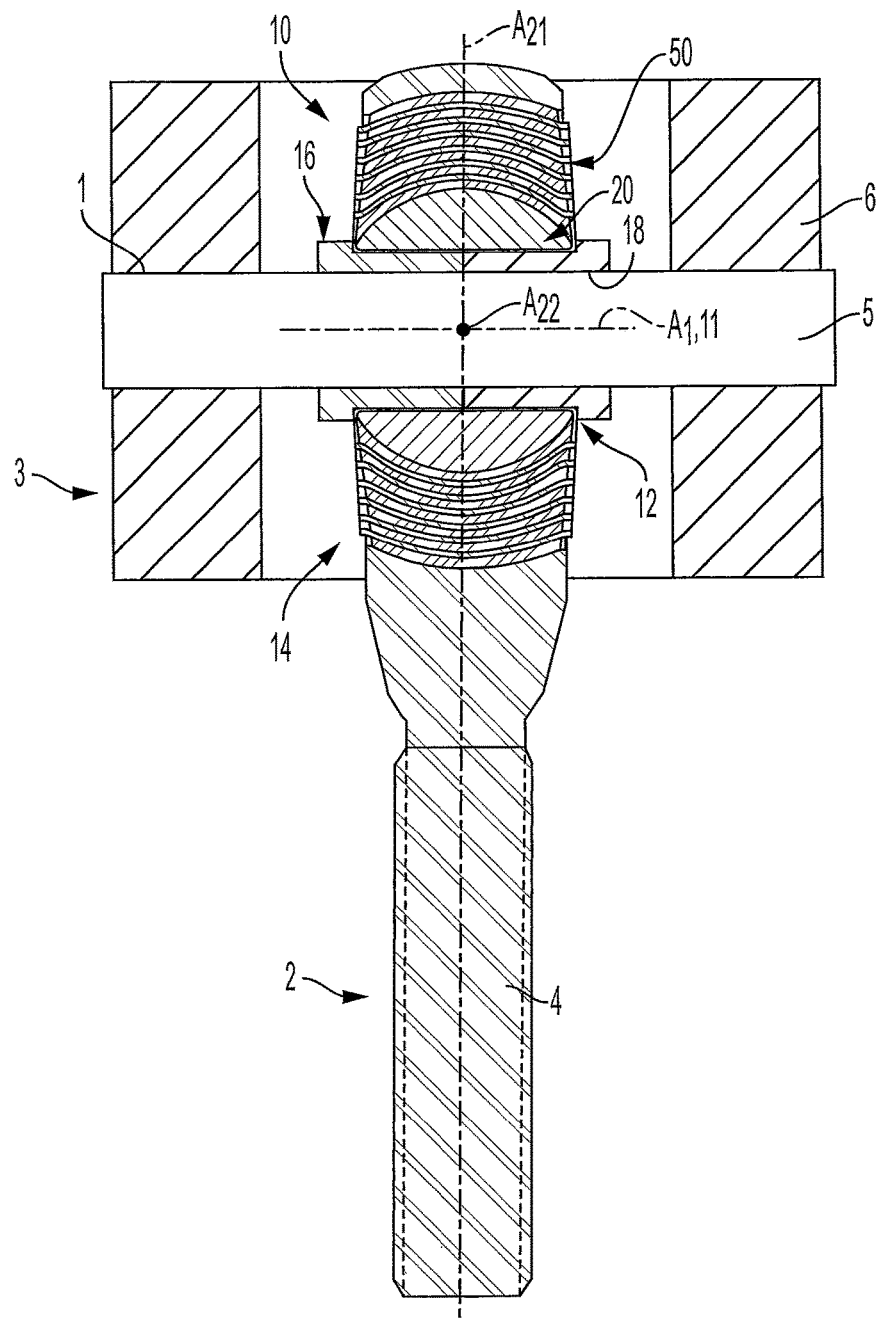
FIG. 17 is an axial cross-sectional view of the bearing assembly in one preferred application of the present invention in which the first, inner member is relatively fixed and the second, outer member is relatively displaceable.
Figure 18:
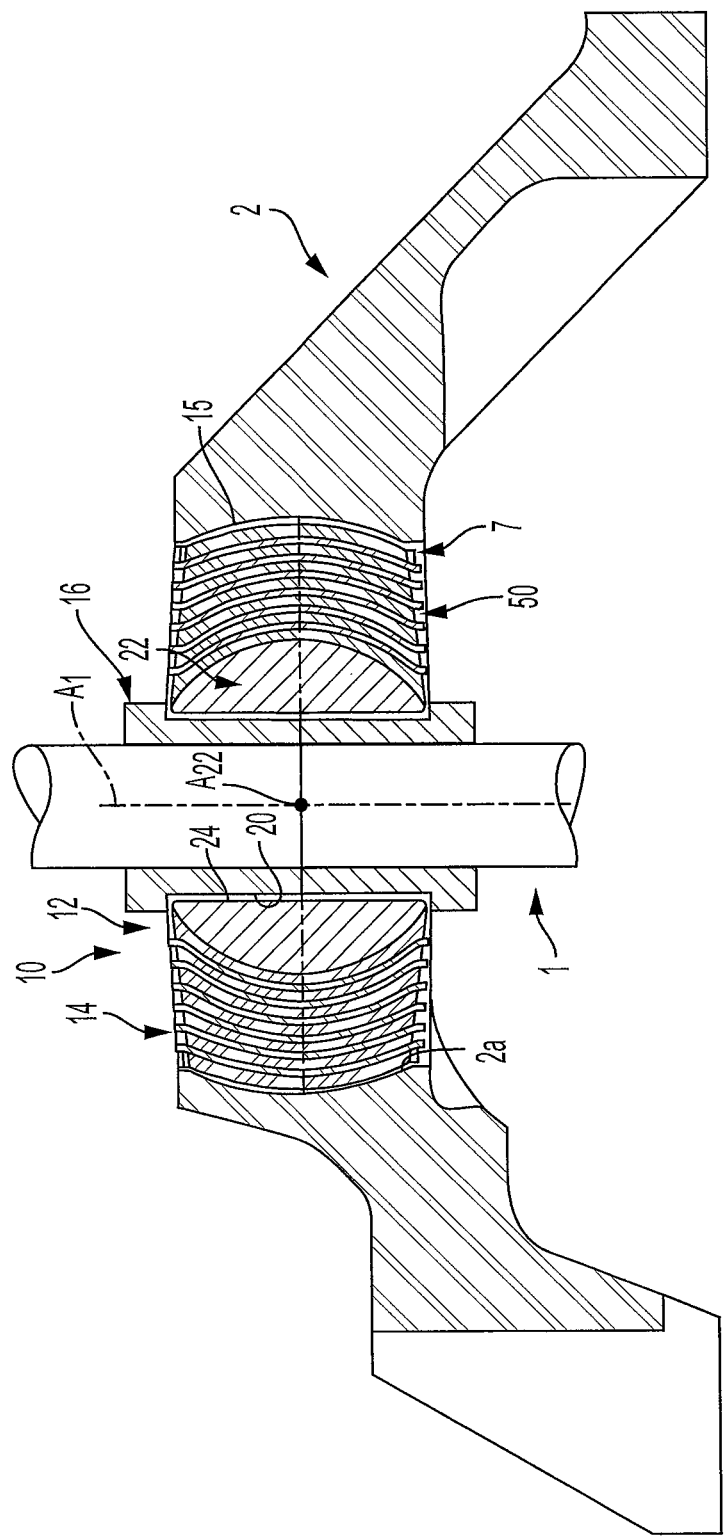
FIG. 18 is an axial cross-sectional view of the bearing assembly in another preferred application of the present invention in which the first, inner member is relatively displaceable and the second, outer member is relatively fixed.

Referring now to the drawings in detail, wherein like numbers are used to indicate like elements throughout, there is shown in FIGS. 1-19 a bearing assembly 10 for movably coupling an inner, first member 1 with an outer, second member 2 so as to form a mechanical assembly 3. One of the first and second members 1, 2 is angularly displaceable about a first axis $A_1$ extending centrally through the first member 1 and also about at least one second axis $A_{2n}$ generally intersecting (e.g., generally perpendicular as depicted), or generally skewed with respect to, the first axis $A_{2n}$; preferably, the second member 2 "turns" or "twists" about the first axis $A_1$ and/or "tilts" or "cocks" relative to the first member 1 about one or more second axes $A_{2n}$, or vice-versa. Preferably, the mechanical assembly 3 is for a rotary aircraft wing assembly; for example the second component 2 may be a connecting/adjustment rod 4 (or a portion thereof) and the first component 1 may be a pin 5 for connecting the rod 4 to a frame 6, as depicted in FIG. 17, but may be any other appropriate components having relative motion about two or more axes $A_1$, $A_{2n}$, such as shown in FIG. 18.

The bearing assembly 10 basically comprises an inner plain bearing section 12 connectable with the first component 1 and an outer, generally cylindrical elastomeric bearing section 14 disposed about the plain bearing section 12 and connected with the second component 2. The two bearing sections 12, 14 are centered about a bearing centerline 11, which is substantially coaxial with the first axis $A_1$ when connected with the first member 1. The inner bearing section 12 includes an inner ring 16 connectable with the first member 1 and having a centerline 17 at least generally coaxial with the first axis $A_1$ and an outer, generally circular cylindrical bearing surface 20. Preferably, the inner ring 16 has a central bore 18 configured to receive a portion of the first member 1, so as to connect the first member 1 with the bearing assembly 10, but may alternatively include a shaft portion 19 (FIG. 19) or any other appropriate means to connect the ring 16 with the first member 1.

Further, an outer ring 22 is disposed about the inner ring 16 and has an inner, generally circular cylindrical bearing surface 24 disposed against the inner ring bearing surface 20. The inner ring bearing surface 20 and the outer ring bearing surface 24 are each configured such that one of the inner and outer ring bearing surfaces 20 or 24 slides against the other one of the bearing surfaces 24, 20, respectively, when the movable one of the first and second members 1 or 2 angularly displaces about the first axis $A_1$.

Also, the inner and outer rings 16, 22 are engageable with each other to substantially prevent relative displacement between the two rings 16, 22 when the movable one of the first and second members 1, 2 angularly displaces about the at least one second axis $A_{2n}$. Further, the elastomeric bearing section 14 is configured such that at least a portion of the elastomeric bearing 14 flexes when the movable one of the first and second members 1, 2 angularly displaces about the at least one second axis $A_{2n}$, thereby supporting relative movement between the inner and outer members 1, 2. Preferably, the second member 2 has an inner circumferential surface 2a defining a bore 7 and the bearing assembly 10 is disposed within the bore 7, the elastomeric bearing section 14 having an outer surface 15 bonded or frictionally engaged with the second component inner surface 2a to connect the bearing section 14 with the second component 2.

Preferably, the movable one of the first and second members 1 or 2 is angularly displaceable about a plurality of separate second axes $A_{2n}$ (e.g., $A_{21}$, $A_{22}$, etc.), each generally intersecting (i.e., either perpendicular (as shown) or forming an acute angle) or skewed with respect to the first axis $A_1$. As such, the inner and outer rings 16, 22 of the plain bearing section 12 are configured to angularly displace about each separate one of the second axes $A_{2n}$ when the inner member 1 displaces relative to the outer member 2, and at least a portion of the elastomeric bearing section 14 is configured to flex whenever either one of the first and second members 1, 2 angularly displaces about each one of the second axes $A_{2n}$. Therefore, the bearing assembly 10 is capable of supporting the relative movement between the two members/components 1, 2 during a variety of motions as typically occurs during operation of a rotary aircraft or other complex mechanism or machine.

Figure 1:
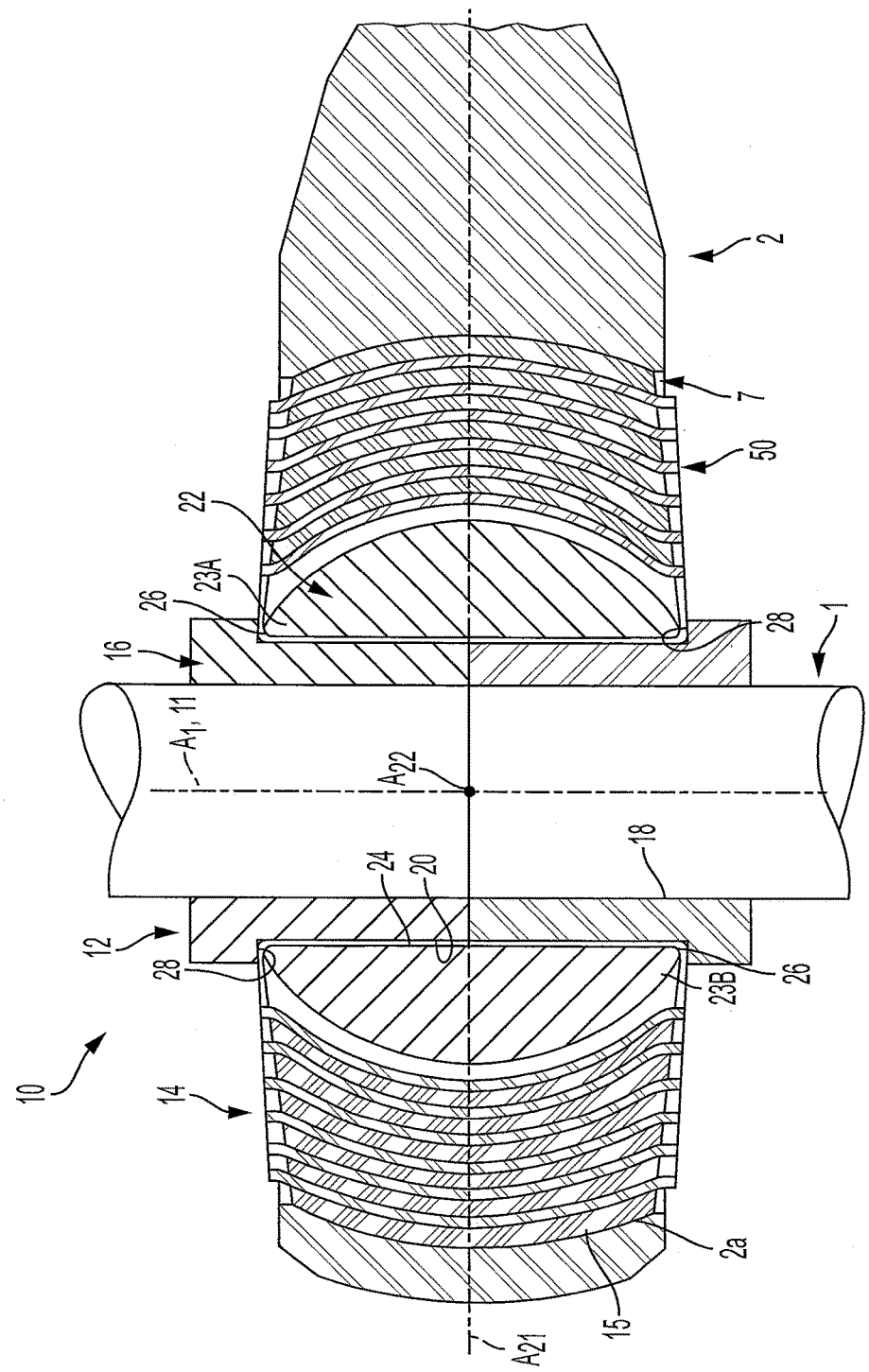
FIG. 1 is an axial cross-sectional view of the bearing assembly of the present invention, shown in a mechanical assembly coupled with an inner, first member and an outer, second member.
Figure 2:
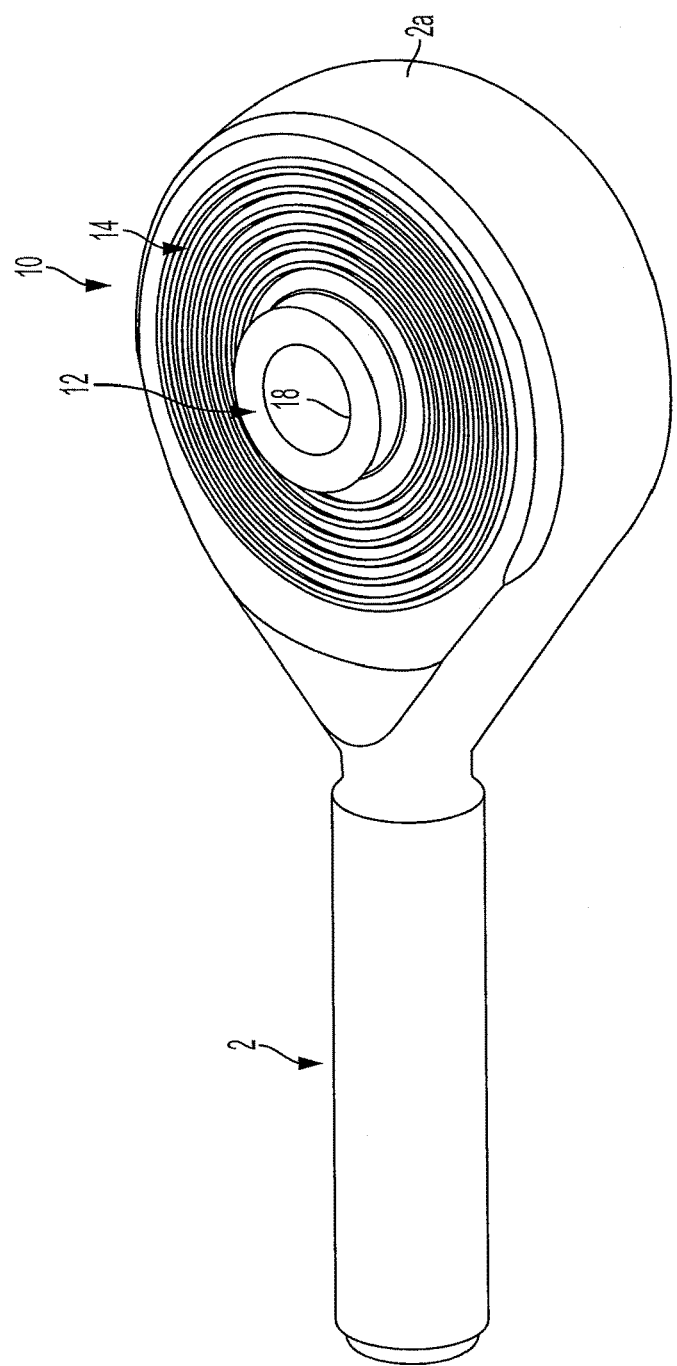
FIG. 2 is a perspective view of the bearing assembly connected with the second member.
Figure 5:
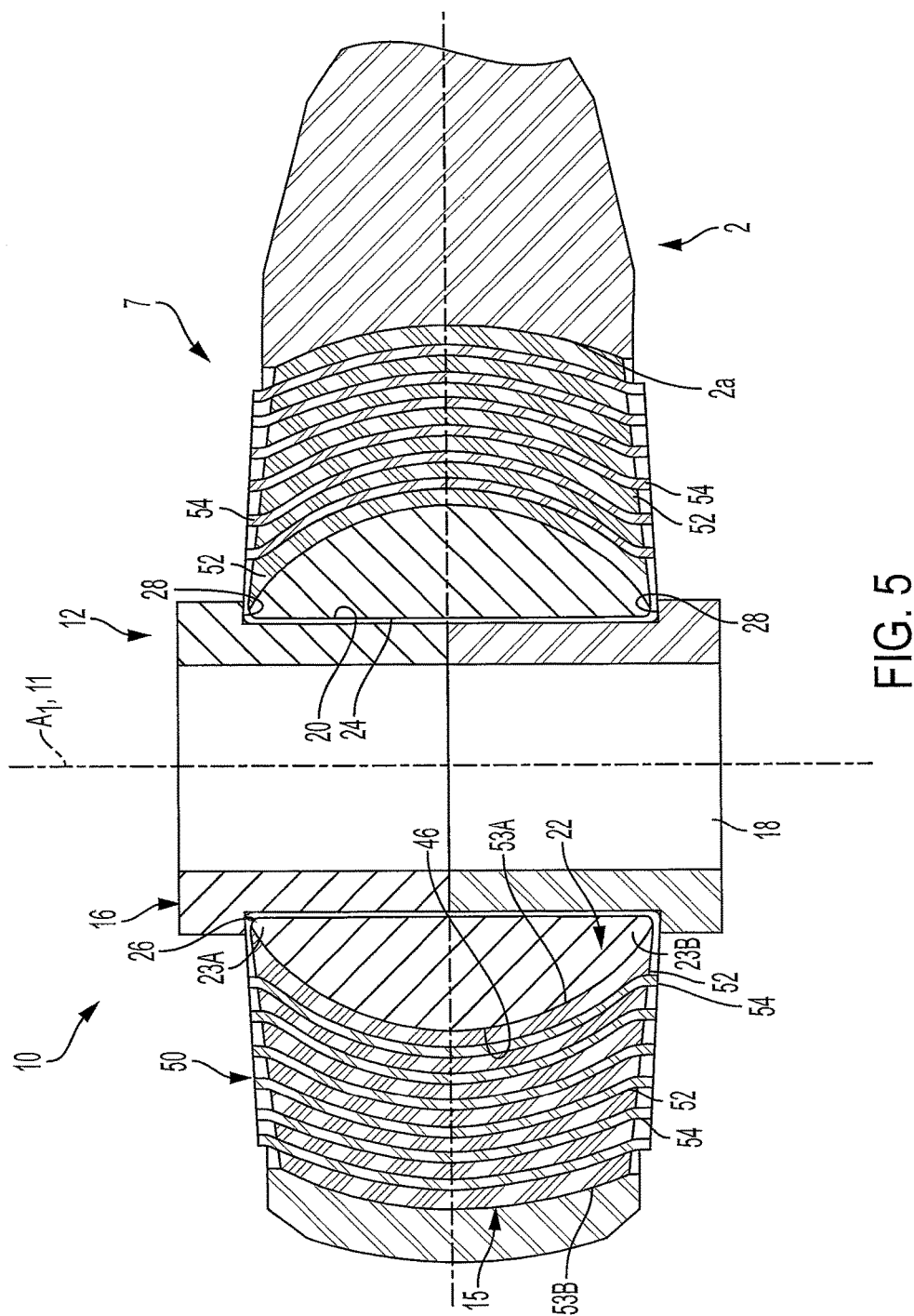
FIG. 5 is an enlarged, broken-away view of a portion of FIG. 1, shown without the first member.
Figure 7:
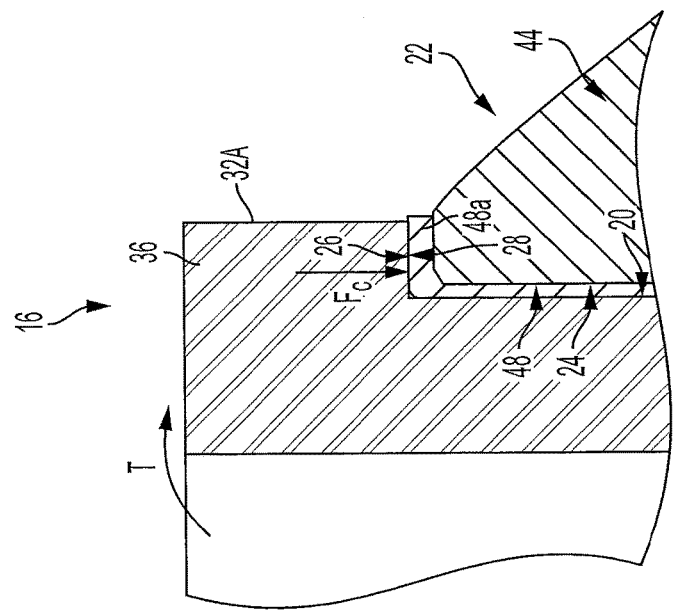
FIG. 7 is a broken-away, greatly enlarged view of a portion of FIG. 6 showing the interaction between contact surfaces of inner and outer rings of the plain bearing section.

Referring to FIGS. 1 and 5, the plain bearing outer ring 22 has opposing axial ends 23A, 23B and at least one generally radial contact surface 26 located on at least one, and preferably both, of the two axial ends 23A, 23B. The inner ring 16 has at least one and preferably at least two facing, generally radial contact surfaces 28 each disposed on or against a separate one of the outer ring contact surfaces 26. As such, engagement between the outer ring contact surface(s) 26 and the inner ring contact surface(s) 28 prevents relative displacement between the inner and outer rings 16, 22 when the moveable one of the first and second members 1 or 2 angularly displaces about the at least one second axis $A_{2n}$. Specifically, when the second, outer member 2 is movable relative to the first member 1, angular displacement of the second member 2 about one or more second axes $A_{2n}$ causes at least a portion of the elastomeric bearing section 14 to flex and transfer torque to the plain bearing outer ring 22, but engagement of outer ring radial surface(s) 26 with the radial contact surfaces 28 of the fixed inner ring 16 prevents relative displacement of the outer and inner rings 22, 16 about the second axis(es) $A_{2n}$. Alternatively, when the first, inner member 1 is movable relative to the second member 2, a torque T applied to the first member 1 angularly displaces of the member 1 about one or more second axes $A_{2n}$, causing the connected plain bearing inner ring 16 to displace with the member 1 so that the inner ring radial contact surface(s) 28 each push against the engaged outer ring radial contact surface(s) 26 with a contact force $F_C$, as indicated in FIG. 7. As a result, the outer ring 22 displaces with the inner ring 16 and the first member 1 while at least a portion of the elastomeric bearing section 14 connected to the moving outer ring 22 flexes generally about the second axis(es) $A_{2n}$.

Although it is preferred to provide the inner and outer rings 16, 22 with the radial contact surfaces 28, 26, respectively, as described above and in further detail below, the plain bearing inner and outer rings 16, 22 may alternatively be formed without the radial contact surfaces and instead rely solely on engagement between the cylindrical bearing surfaces 20, 24. That is, a torque about one of the second axes $A_{2n}$ that is applied to either one of the inner and outer rings 16, 22 will cause one cylindrical bearing surface 20 or 24 to push against the other bearing surface 24, 20. As such, the two rings 16, 22 become generally locked together and either displace as a single unit or remain immovable with respect to the second axis $A_{2n}$.

Figure 19:
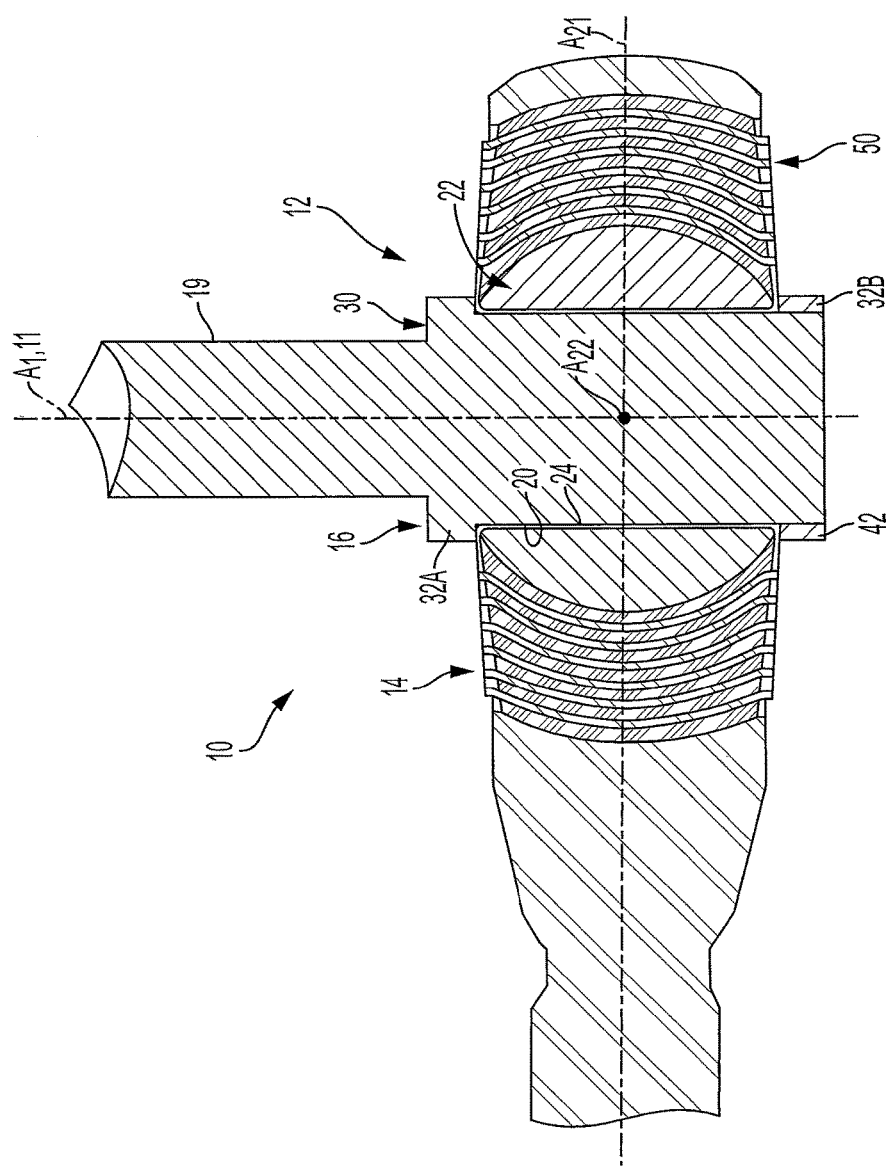
FIG. 19 is an axial cross-sectional view of an alternative construction of the bearing assembly of the present invention in which the plain bearing inner ring has a shaft portion connectable with the first, inner member.

Referring to FIGS. 6-13, the inner ring 16 is preferably formed as a generally circular cylindrical, sleeve-like body 30 having opposing axial ends 30a, 30b and two radially-enlarged end sections 32A, 32B each formed or attached to a separate one of the axial ends 30a, 30b, respectively. The cylindrical body 30 has an inner and outer circumferential surfaces 31A, 31B respectively providing the bore 18 and the inner ring bearing surface 20, and each end section 32A, 32B provides a separate one of the two preferred radial contact surfaces 28. Alternatively, the inner ring body 30 may be formed as a generally solid cylinder, i.e., without a central bore, and may include the shaft portion 19 extending axially outwardly from one body end 30*a* or 30*b*, as depicted in FIG. 19. The shaft portion 19 is configured to attach to or otherwise engage with the first member 1 so as to connect the member 1 with the bearing assembly 10 and thereby also the second member 2.

Figure 6:
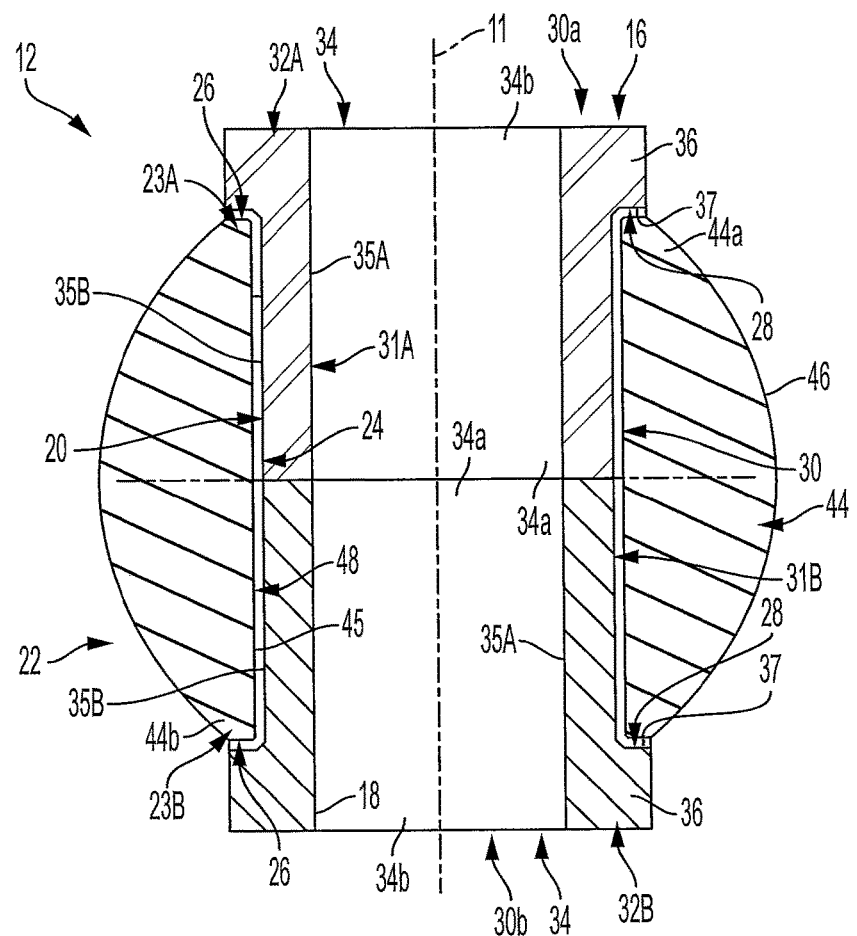
FIG. 6 is an axial cross-sectional view of a first construction of the plain bearing section of the bearing assembly.
Figure 8:
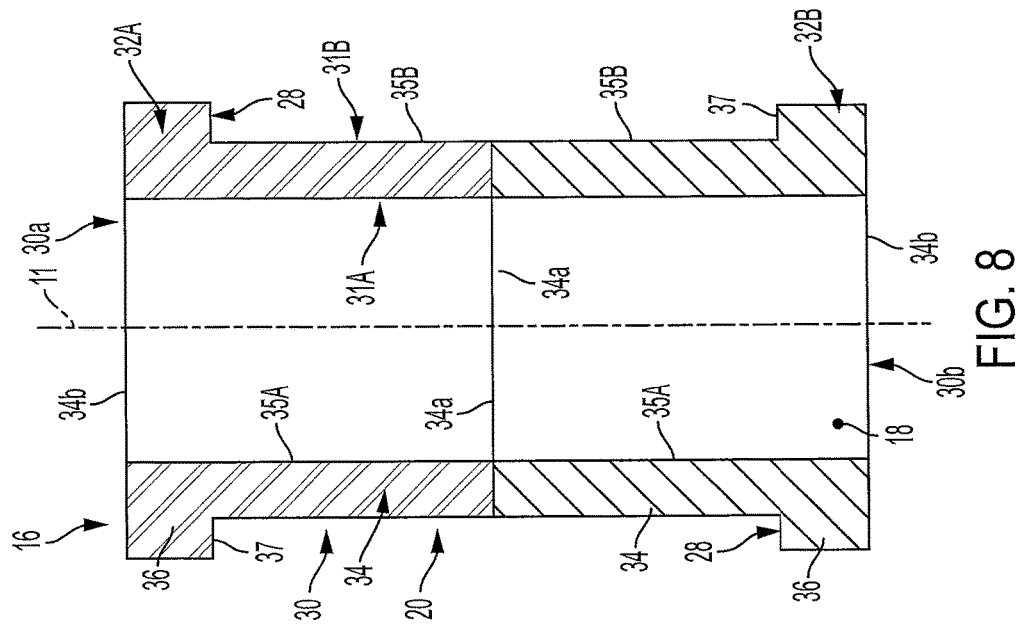
FIG. 8 is an axial cross-sectional view of an inner ring of the first construction plain bearing section.
Figure 9:
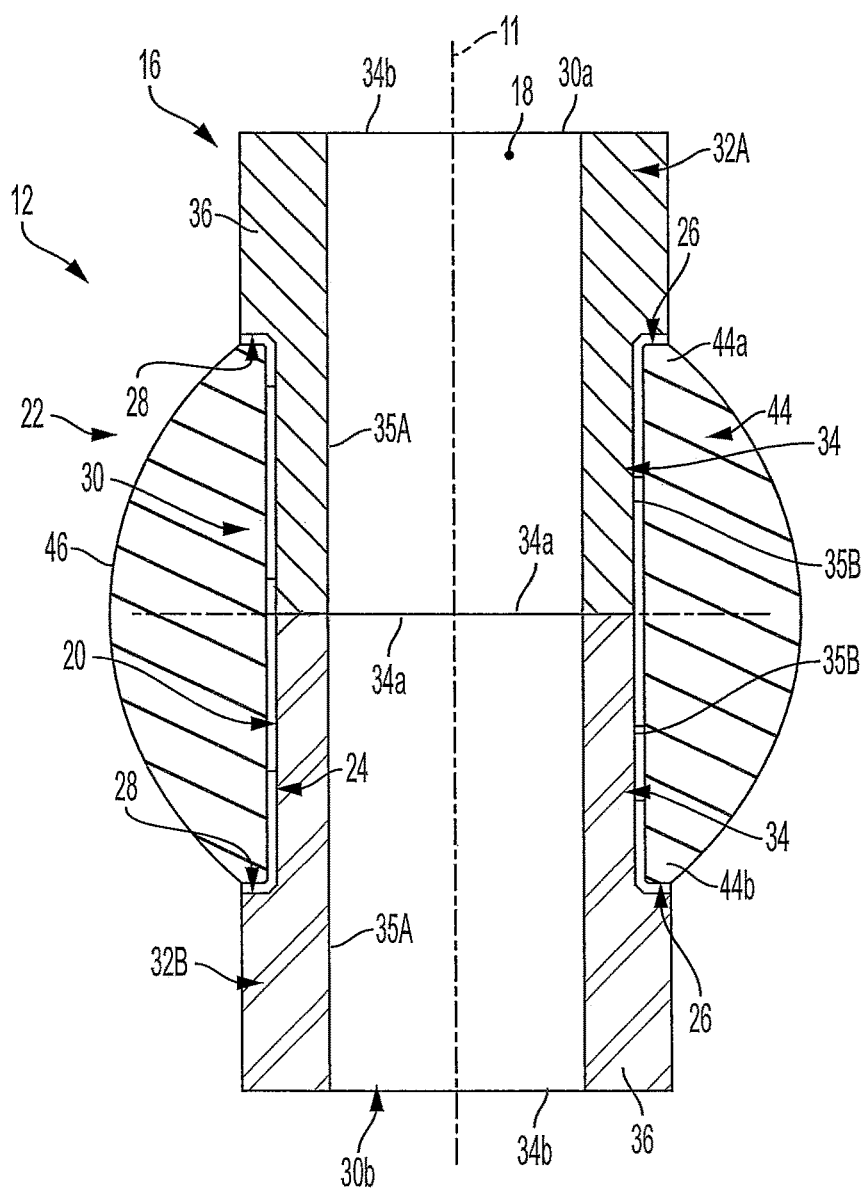
FIG. 9 is an axial cross-sectional view of a second construction of the plain bearing section of the bearing assembly.

In certain constructions as depicted in FIGS. 6-9, the cylindrical body 30 includes two generally cylindrical body sections 34 each having an inner end 34*a* disposed within the outer ring 22 and generally against the inner end 34*a* of the other cylindrical section 34, and an opposing outer end 34*b*. Each body section 34 has an inner circumferential surface 35A defining a portion of the inner ring bore 18, an outer circumferential surface section 35B providing a portion of the inner ring bearing surface 20 and an integral, radially-outwardly extending shoulder 36 at the outer end 34*b*. The shoulder 36 provides one of the enlarged end sections 32A or 32B and has a generally circular radial contact surface 37 extending substantially continuously about the centerline 11 and engageable against the proximal axial end 23A or 23B of the outer ring 22. Each shoulder 36 may be formed having a relatively lesser axial length as shown in FIG. 6-8 or a relatively greater axial length as depicted in FIG. 9 when desired to increase the inner ring surface area in engagement with the first member 1.

Figure 10:
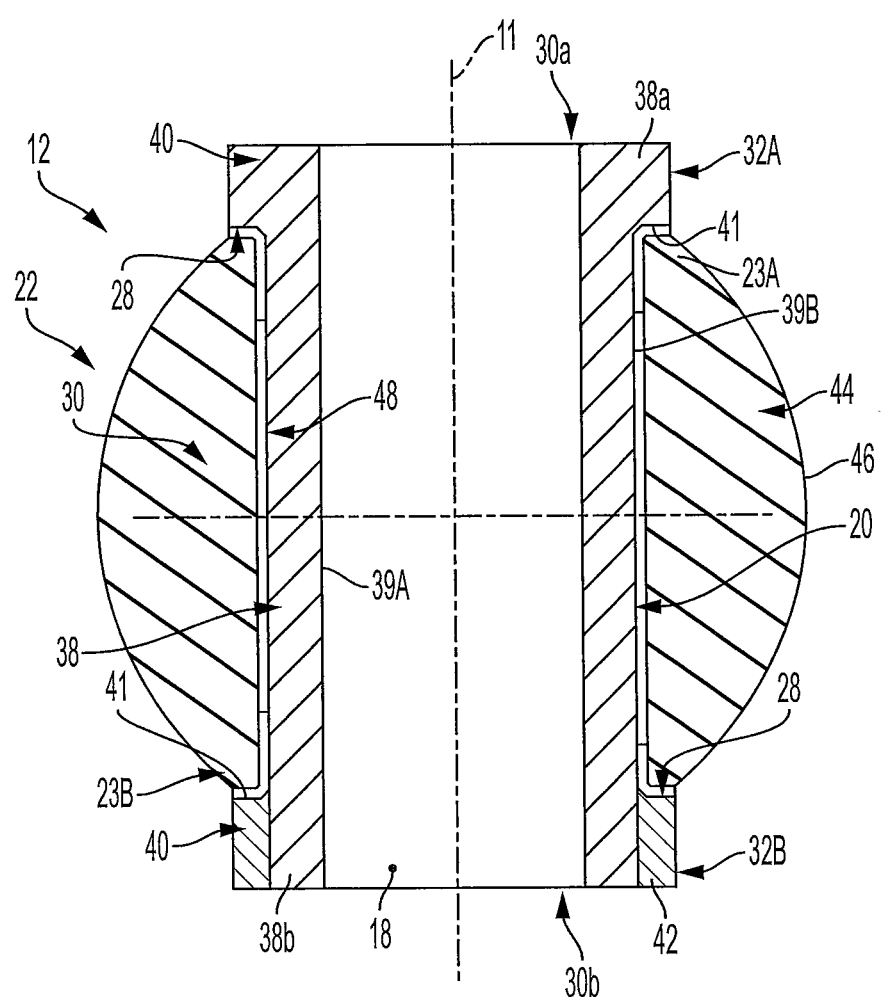
FIG. 10 is an axial cross-sectional view of a third construction of the plain bearing section of the bearing assembly.
Figure 11:
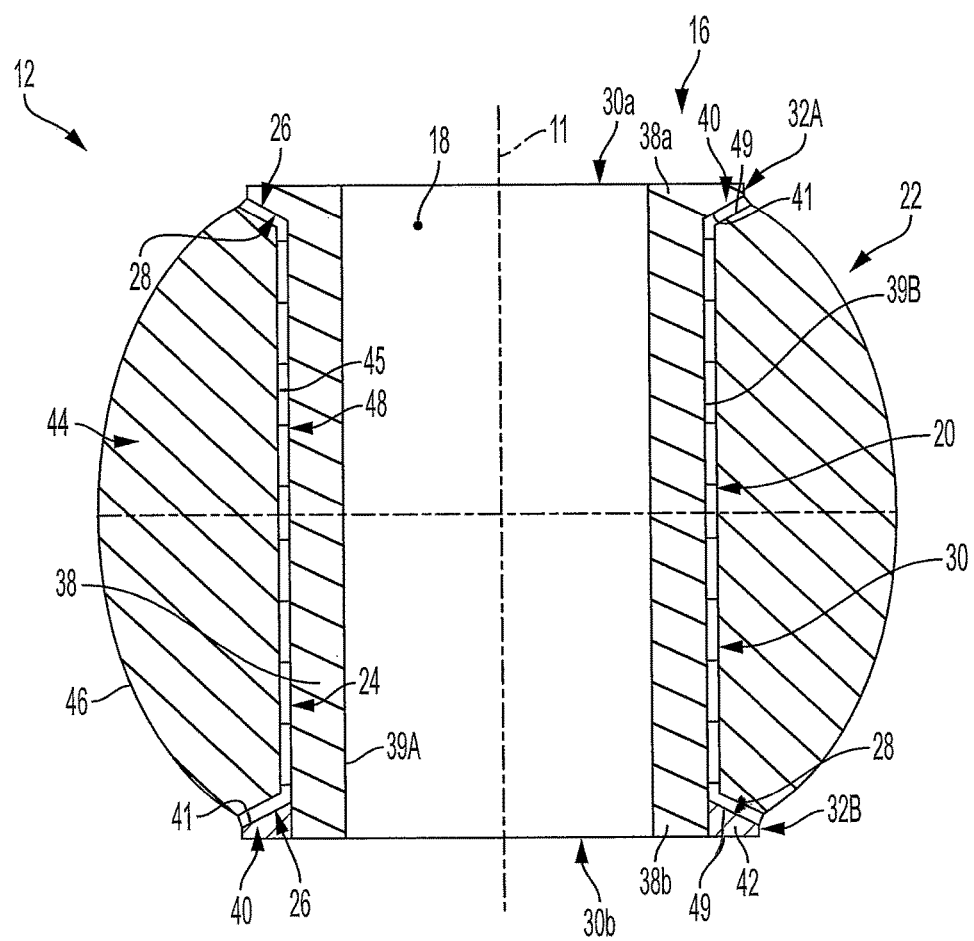
FIG. 11 is an axial cross-sectional view of a fourth construction of the plain bearing section of the bearing assembly.
Figure 13:
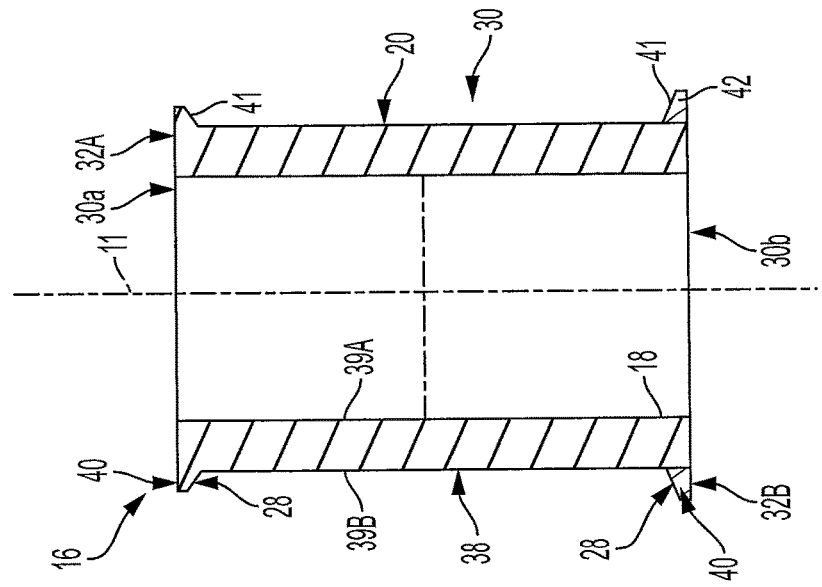
FIG. 13 is an axial cross-sectional view of the inner ring of the fourth construction plain bearing section of FIG. 11.
Figure 12:
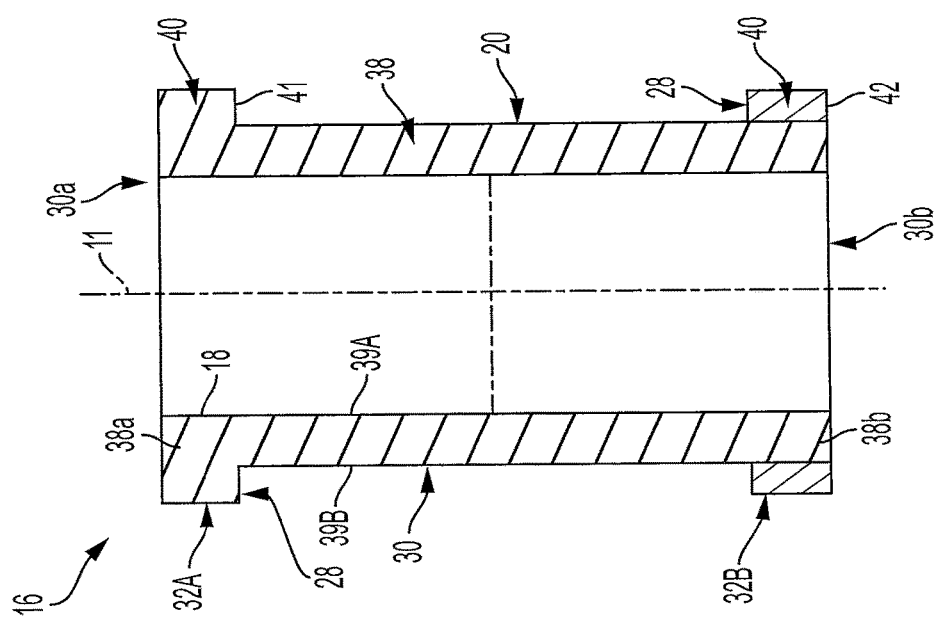
FIG. 12 is an axial cross-sectional view of the inner ring of the third construction plain bearing section of FIG. 10.
Figure 14:
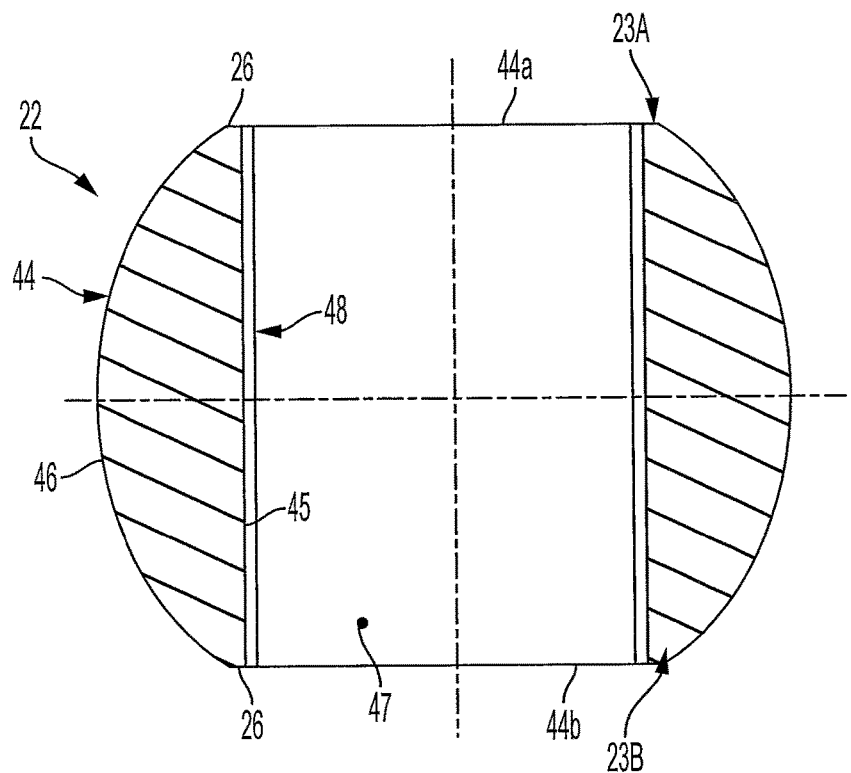
FIG. 14 is an axial cross-sectional view of the outer ring of the first, second and third constructions of the plain bearing section.

In other constructions as shown in FIGS. 10-13, the inner ring 16 includes a central, circular cylindrical section 38 having two opposing axial ends 38*a*, 38*b* and at least one and preferably two generally annular shoulder members 40 each attached to or integrally formed with one of the axial ends 38*a* or 38*b*. The central cylindrical section 38 has an inner circumferential surface 39A defining the inner ring bore 18 and an outer circumferential surface 39B providing the inner ring cylindrical bearing surface 20. The one or more shoulder members 40 each have a generally circular radial contact surface 41 extending substantially continuously about the centerline 11 and engageable against the proximal axial end 23A or 23B of the outer ring 22. As depicted in FIGS. 10 and 12, each shoulder 40 may be formed as a generally rectangular cylinder and have a substantially radially-extending contact surface 41. Alternatively, as shown in FIGS. 11 and 13, each shoulder member 40 may be generally conical and have a generally conical contact surface 41 sized to fit within one of two generally conical countersunk bore sections 49 of the outer ring 22, as described below.

As depicted in FIGS. 10 and 12, the central section 38 is preferably formed having one integral shoulder member 40 at one axial end 38*a* or 38*b* and another separate shoulder member 40, preferably formed as a washer or ring 42, attached to other end 38*b*, 38*a* to form the inner ring 16. As such, the inner ring 16 is assembled into the outer ring 22 by inserting the central section 38 into the outer ring bore 47 (see FIGS. 14 and 15), as discussed below, until the integral shoulder member 40 abuts one axial end 23A, 23B of the outer ring 22. Then, the separate washer 42 is attached to the "free" end 38*a* or 38*b* of the central section 38 by any appropriate means, such as by welding, threading, etc. Alternatively, the central section 38 may be formed without an integral shoulder and the inner ring 16 may include two separate shoulder members 40 each attached to a separate one of the central section axial ends 38*a*, 38*b* after the central section 38 is positioned within the outer ring bore 47 (structure not shown).

Although each of the various constructions of the inner ring 16 includes at least one shoulder or shoulder member 40 providing a continuous contact surface 28, the inner ring 16 may alternatively be provided with one or more arcuate shoulders or radial projections, such that each contact surface 28 is non-continuous or formed of separate surface sections (structure not shown). As a further alternative, the one or more shoulders 40 may have axial projections (none shown) each providing a point or limited area contact surface sections engageable against the outer ring contact surfaces 25.

Figure 15:
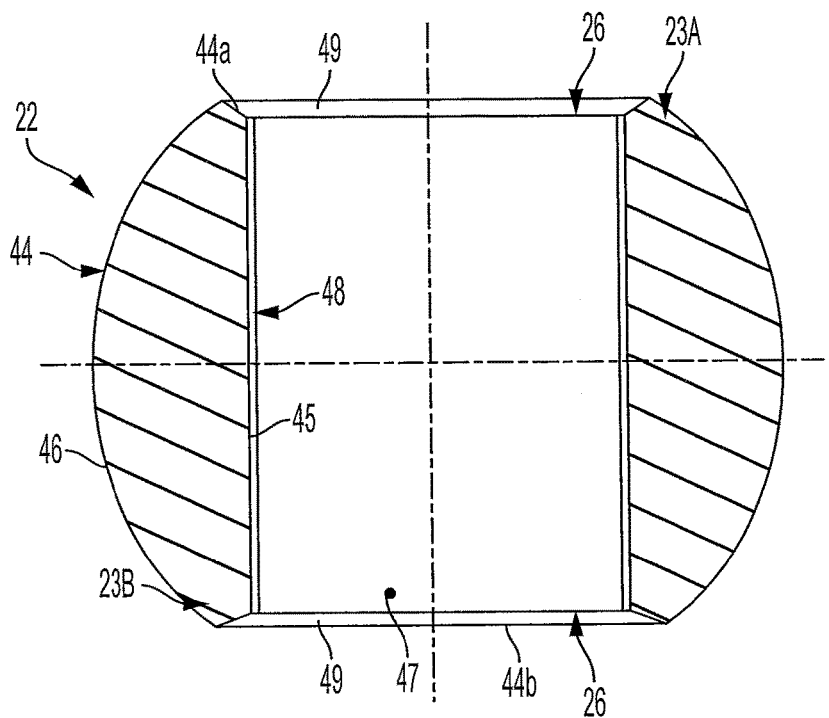
FIG. 15 is an axial cross-sectional view of the outer ring of the fourth construction plain bearing section.

Referring now to FIGS. 6, 7, 9-11, 14 and 15, the outer ring 22 preferably includes a partially spherical body 44 having opposing axial ends 44*a*, 44*b*, a generally circular cylindrical inner circumferential surface 45 and a partially spherical outer surface 46. The cylindrical inner surface 45 extends generally axially between the body end faces 44*a*, 44*b* and defines the interior bore 47, as discussed above and indicated in FIGS. 14 and 15. In certain constructions as shown in FIGS. 6, 7, 9, 10 and 14, the end faces 44*a*, 44*b* of the outer ring body 44, and thus also the contact surfaces 26, are each substantially flat and radially-extending. In other constructions as depicted in FIGS. 11 and 15, the end faces 44*a*, 44*b* and contact surfaces 26 are formed as generally conical "counter-sunk" surfaces 49 each sized and angled to accommodate a separate one of the conical washers 43 as described above. Such a counter-sunk construction enables the inner plain bearing section 12 to be more axially "compact".

Preferably, in each of the various constructions, the outer ring 22 includes a liner layer 48 disposed on the inner surface 45 of the spherical body 44 and providing the bearing surface 24 of the outer ring 22. Further, as depicted in FIG. 7, the liner layer 48 preferably has two radially-outwardly extending end sections 48*a* (only one shown) disposed on each outer ring axial end 23A, 23B and providing the outer ring contact surface 26. The liner layer 48 is provided to substantially reduce friction during relative displacement of the inner and outer rings 16, 22 and is formed of a material having a hardness substantially lesser than a hardness of the inner ring material. Such a liner material may be a polymeric material, for example polytetrafluoroethylene (PTFE), Nylon, PEEK, etc., graphite or a relatively soft metallic material (e.g., bronze, etc.). Alternatively, the liner layer 48 may instead by formed on the outer surface of the inner ring 16, such that the liner 48 provides the inner ring bearing surface 20 and is slidable against the outer ring bearing surface 24 provided by the outer ring inner surface 45.

Further, both the inner ring body 30 and the outer ring body 44 are each preferably formed of a metallic material such as aluminum, low carbon steel, etc., such that the relatively "soft" liner layer 48 is disposed against the metallic inner ring 16. Alternatively, one of the inner and outer rings 16, 22 may be formed of a relatively soft metallic material (e.g., bronze), a polymeric material or any other appropriate material, and without any liner layer being provided.

Figure 16:
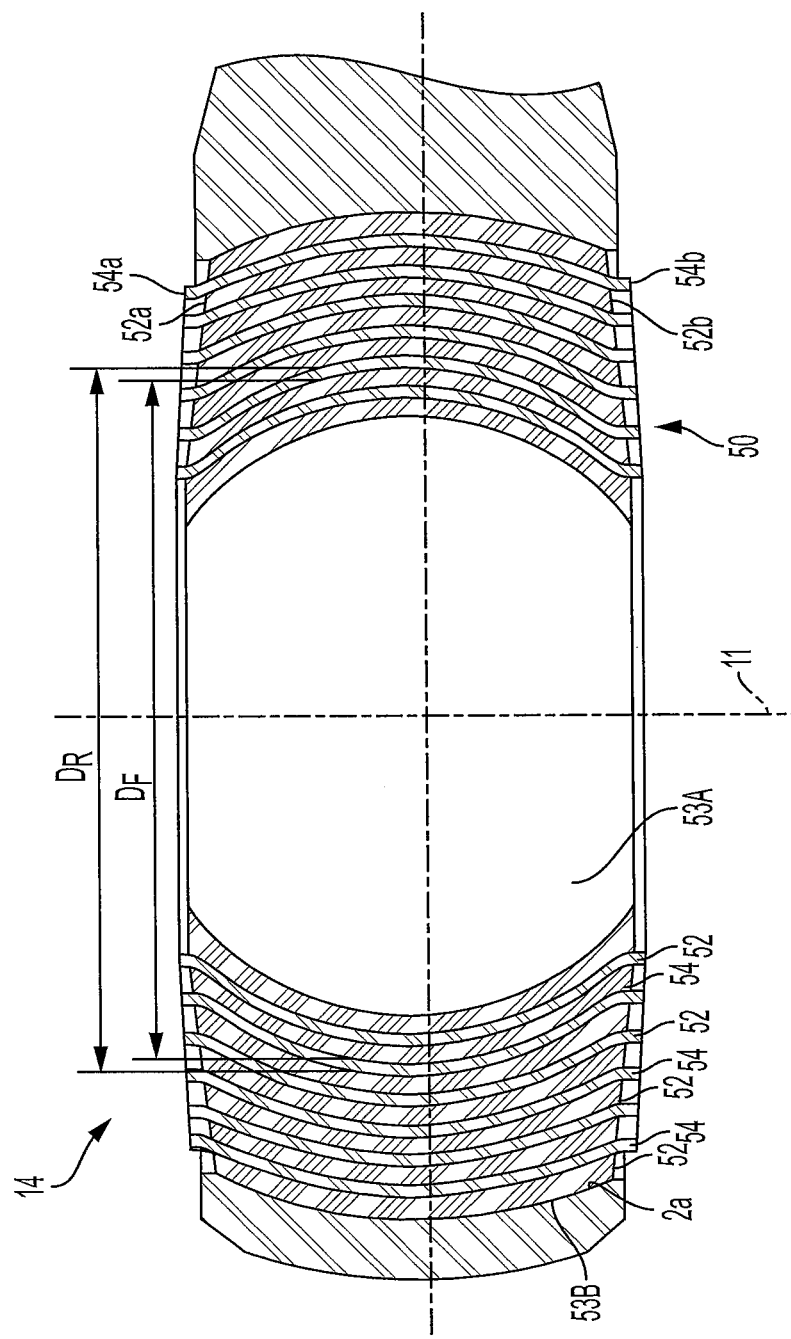
FIG. 16 is an axial cross-sectional view of an elastomeric bearing section of the bearing assembly, shown connected with the outer, second member.

Referring now to FIGS. 1, 5 and 16, the elastomeric bearing section 14 is preferably formed as a laminated bearing 50 including a plurality of alternating, substantially flexible laminae 52 and substantially rigid laminae 54 nested coaxially generally about the bearing centerline 11. The laminated bearing section 14 is configured such that at least a portion of the laminated bearing section 14 flexes or deflects (e.g., pivots and/or twists) when the first member 1 and/or the second member 2 angularly displaces about at least one second axis $A_{2n}$. Specifically, at least one and preferably a plurality of the flexible laminae 52 are each compressed, extended and/or twisted relative to a pair of coaxially or radially adjacent rigid laminae 54 (i.e., on each radial side of the specific lamina 52) during flexure of the laminated bearing section 14, to thereby enable or accommodate angular displacements of the second member 2 relative to the first member 1, or vice-versa, when tilting or pivoting about a second axis $A_{2n}$ perpendicular to the first, central axis $A_1$.

Alternatively, the elastomeric bearing section 14 may be formed of a single generally cylindrical solid elastomeric body (not shown) or a plurality of generally wedge-shaped elastomeric body sections (none shown), each having an inner surface attached to the plain bearing outer ring 22 and an outer surface attached to the second member 2. With the solid cylindrical body or wedge shaped body sections, the elastomeric bearing section 14 bends, deflects or twists as necessary to accommodate movement of one of the first and second members 1, 2 about one or more second axes $A_{2n}$.

Referring to FIGS. 5 and 16, the preferred laminated bearing section 14 is preferably formed by disposing or interposing alternating layers of generally tubular flexible laminae 52 and generally tubular rigid laminae 54 such that each flexible layer/lamina 52 is surrounded circumferentially by a diametrically larger rigid lamina 54, and vice-versa. In other words, each one of the flexible and rigid laminae 52, 54 has an outside diameter $d_F$, $d_R$ and the plurality of laminae 52, 54 are arranged such that each one of the laminae 52, 54 is disposed within all of the other laminae 52, 54 having an outside diameter $d_F$, $d_R$ greater than the outside diameter $d_F$ or $d_R$ of the one lamina 52 or 54, as indicated in FIG. 16. Preferably, the laminated bearing section 14 is formed such the height or axial length of the laminae 52, 54 decreases in a direction radially outwardly from the bearing centerline 11.

Specifically, each one of the laminae 52, 54 has opposing axial ends 52a, 52b or 54a, 54b, respectively, and an axial length (not indicated) between the opposing axial ends 52a, 52b and 54a, 54b, with the laminae 52, 54 arranged so that the axial length of each laminae 52 or 54 is lesser than the axial length of all laminae 52, 54 disposed within the one laminae 52, 54. However, the laminated bearing section 14 may be formed with laminae 52, 54 having an axial length that increases outwardly from the centerline 11 or having the substantially the same axial length. Furthermore, each one of the flexible and rigid laminae 52, 54 is preferably partially spherical, as depicted in the drawing figures, but may alternatively be substantially circular cylindrical or any other appropriate shape.

Preferably, each one of the flexible laminae 52 is formed of an elastomer, such as for example, natural or synthetic rubber, and each one of the rigid laminae 54 is formed of a metallic material, such as steel or aluminum, but may be formed of any other appropriate rigid material, such as a ceramic material, a rigid polymer or plastic, etc. Each one of the rigid laminae 54 may include a single, generally tubular shell or may be formed of a plurality of arcuate shell sections spaced circumferentially about the body centerline 51. Further, each flexible lamina 52 is preferably bonded to both a radially-inner adjacent rigid lamina 54 and to a radially-outer adjacent rigid lamina 54. Most preferably, all of the flexible laminae 52 are molded to the rigid laminae 54 under compression such that each flexible lamina 52 has a compressive "preload" between the associated radially adjacent pair of rigid laminae 54. Preferably, the innermost lamina is an elastomeric lamina having an inner circumferential surface 53A bonded to the outer surface 46 of the outer ring 22 and the outermost lamina is an elastomeric lamina 52 having an outer circumferential surface 53B bonded to the inner circumferential surface 2a of the second component 2, as indicated in FIGS. 5 and 16. Alternatively, either or both of the innermost and outermost lamina may be a metallic laminae 54 having an inner surface frictionally engaged with the outer ring outer surface 46 or an outer surface frictionally engaged with the second component inner surface 2a, or be coupled to the inner ring 22 or/and second component by any other appropriate means.

Although the elastomeric bearing section 14 is depicted and described as a single, generally cylindrical laminated body 50, the elastomeric bearing section may alternatively be formed as two or more generally wedge-shaped laminated bearing sections (none shown). Such wedge-shaped laminated bearing sections each include alternating generally arcuate flexible laminae 52 and generally arcuate rigid laminae 54 formed generally as described above for the single cylindrical body 50.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing assembly for movably coupling a first, inner member with a second, outer member, a movable one of the first and second members being angularly displaceable with respect to the other one of the two members about a first axis extending centrally through the inner member and about at least one second axis generally intersecting the first axis or skewed with respect to the first axis, the bearing assembly comprising:

an inner plain bearing section including an inner ring having a centerline at least generally coaxial with the first axis, the inner ring being connectable with the first member and having an outer circular cylindrical bearing surface, and an outer ring disposed about the inner ring and having an inner circular cylindrical bearing surface disposed against the inner ring bearing surface, one of the inner and outer ring bearing surfaces being slidable against the other one of the inner and outer ring bearing surfaces when the movable one of the first and second members angularly displaces about the first axis, the inner and outer rings being engageable with each other to substantially prevent relative displacement between the two rings when the movable one of the first and second members angularly displaces about the at least one second axis; and an outer elastomeric bearing section disposed about the plain bearing section, connected with the second member and configured such that at least a portion of the elastomeric bearing section flexes when the movable one of the first and second members angularly displaces about the at least one second axis.

2. The bearing assembly as recited in claim 1 wherein the movable one of the first and second members is angularly displaceable about a plurality of separate second axes each generally intersecting or skewed with respect to the first axis, the plain bearing inner and outer rings being configured to angularly displace about each separate one of the second axes when the inner member displaces relative to the outer member about at least one of the second axes and the at least a portion of the elastomeric bearing being configured to flex when the movable one of the first and second members angularly displaces about each one of the second axes.

3. The bearing assembly as recited in claim 1 wherein the inner ring of the plain bearing section has a central bore configured to receive a portion of the first member so as to connect the first member with the bearing assembly.

4. The bearing assembly as recited in claim 1 wherein the outer ring has opposing axial ends and at least one generally radial contact surface on at least one of the two axial ends and the inner ring has at least one generally radial contact surface disposed against the at least one outer ring contact surface such that engagement between the outer ring contact surface and the inner ring contact surface prevents relative displacement between the inner and outer rings when the moveable one of the first and second angularly displaces about the at least one second axis.

5. The bearing assembly as recited in claim 4 wherein the outer ring has at least two generally radial contact surfaces each located on a separate one of the two axial ends and the inner ring has two facing, generally radial contact surfaces each disposed against a separate one of the at least two outer ring contact surfaces.

6. The bearing assembly as recited in claim 1 wherein the outer ring includes a partially spherical body having opposing axial end faces, the inner circular cylindrical surface extending generally axially between the end faces and defining an interior bore.

7. The bearing assembly as recited in claim 6 wherein the outer ring includes a liner layer disposed on the inner surface of the spherical body and providing the bearing surface of the outer ring, the layer being formed of a material having a hardness substantially lesser than a hardness of the inner ring material.

8. The bearing assembly as recited in claim 1 wherein the outer ring has opposing axial ends and the inner ring includes two generally cylindrical sections each having an inner end disposed within the outer ring and against the inner end of the other cylindrical section and an opposing outer end, each cylindrical section having an outer circular cylindrical surface section providing a portion of the inner ring bearing surface and each outer axial end having a radial contact surface disposable against a separate one of outer ring axial ends.

9. The bearing assembly as recited in claim 1 wherein the inner ring includes a central cylindrical section having two opposing axial ends and at least one end section attached to one of the central section axial ends and providing a radial contact surface disposable against the outer ring.

10. The bearing assembly as recited in claim 1 wherein the elastomeric bearing section is formed as a laminated bearing including a plurality of alternating, substantially flexible laminae and substantially rigid laminae nested coaxially generally about a centerline.

11. The bearing assembly as recited in claim 10 wherein each flexible laminae is formed of an elastomeric material and each rigid laminae is formed of one of a metallic material and a rigid polymeric material.

12. The bearing assembly as recited in claim 10 wherein at least one of the flexible laminae is at least one of compressed, extended and twisted relative to a pair of coaxially adjacent rigid laminae during flexure of the laminated bearing section.

13. The bearing assembly as recited in claim 10 wherein each one of the flexible and rigid laminae has an outside diameter, the plurality of laminae being arranged such that each one of the laminae is disposed within all of the other laminae having an outside diameter greater than the outside diameter of the one lamina.

14. The bearing assembly as recited in claim 10 wherein each one the flexible and rigid laminae is partially spherical.

15. The bearing assembly as recited in claim 1 wherein the elastomeric bearing portion includes a generally cylindrical body or at least two generally wedge-shaped body portions.

16. The bearing assembly as recited in claim 1 wherein the second member has a bore and the bearing assembly is disposed within the second member bore.

17. A mechanical assembly comprising:
a first, inner member;
a second, outer member, a movable one of the first and second members being angularly displaceable with respect to the other one of the two members about a first axis extending centrally through the inner member and about at least one second axis generally intersecting the first axis or generally skewed with respect to the first axis; and
a bearing assembly including:
an inner plain bearing section including a generally cylindrical inner ring having a centerline at least generally coaxial with the first axis, the inner ring being connectable with the first member and having an outer circular cylindrical bearing surface, and an outer ring disposed about the inner ring and having an inner circular cylindrical bearing surface disposed against the inner ring bearing surface, one of the inner and outer ring bearing surfaces being slidable against the other one of the inner and outer ring bearing surfaces when the movable one of the first and second members angularly displaces about the first axis, the inner and outer rings being engageable with each other to substantially prevent relative displacement between the two rings when the movable member one of the first and second members angularly displaces about the at least one second axis; and
an outer elastomeric bearing section disposed about the plain bearing section, connected with the second member and configured such that at least a portion of the elastomeric bearing section flexes when the movable one of the first and second members angularly displaces about the at least one second axis.

* * * * *